United States Patent
Murphy et al.

(10) Patent No.: US 12,401,850 B2
(45) Date of Patent: Aug. 26, 2025

(54) IN-BROWSER, MULTI-PLAYER 3D ROBOTIC SIMULATOR

(71) Applicant: Robotify Labs Limited, Glasnevin (IE)

(72) Inventors: Andrew Murphy, Terenure (IE); Adam Dalton, Donaghmede (IE); Evan Darcy, Swords (IE)

(73) Assignee: Robotify Labs Limited, Dublin (IE)

( * ) Notice: Subject to any disclaimer, the term of this patent is extended or adjusted under 35 U.S.C. 154(b) by 352 days.

(21) Appl. No.: 18/245,118

(22) PCT Filed: Sep. 13, 2021

(86) PCT No.: PCT/EP2021/075113
§ 371 (c)(1),
(2) Date: Mar. 13, 2023

(87) PCT Pub. No.: WO2022/053682
PCT Pub. Date: Mar. 17, 2022

(65) Prior Publication Data
US 2023/0362440 A1   Nov. 9, 2023

(30) Foreign Application Priority Data
Sep. 11, 2020 (GB) .................................... 2014332

(51) Int. Cl.
*H04N 21/443* (2011.01)
*A63F 13/34* (2014.01)
(Continued)

(52) U.S. Cl.
CPC ......... *H04N 21/4431* (2013.01); *A63F 13/34* (2014.09); *A63F 13/352* (2014.09); *A63F 13/355* (2014.09); *A63F 13/57* (2014.09)

(58) Field of Classification Search
CPC ... H04N 21/4431; A63F 13/34; A63F 13/352; A63F 13/355; A63F 13/57
See application file for complete search history.

(56) References Cited

U.S. PATENT DOCUMENTS 5,526,478 A * 6/1996 Russell, Jr. ............. G06T 19/00
715/202
6,626,954 B1 * 9/2003 Kamachi ............... G06T 13/205
715/236

(Continued)

OTHER PUBLICATIONS

Anonymous: "Model-view-controller—Wikipedia", Sep. 7, 2020 (Sep. 7, 2020), Retrieved from the Internet:URL:https://en.wikipedia.org/w/index.php?title=Model-view-controller&oldid=977278714 [retrieved on Jan. 12, 2022].

(Continued)

*Primary Examiner* — Reginald A Renwick
(74) *Attorney, Agent, or Firm* — Brian J. Colandreo; Jeffrey T. Placker; Holland & Knight LLP

(57) ABSTRACT

This invention relates to a computer implemented method and a computer program product for simulating a 3D object in a browser and sharing that simulation with a plurality of other users on other client devices. There is provided an in-browser simulator comprising: a rendering engine: a physics engine; and an application programming interface (API) mapping the functions of the physics engine to the rendering engine. The API is configured to establish a communication link with the other client devices and to share the simulation data with those devices over the established communication link. In one embodiment, multiple client devices can share their simulations contemporaneously and simulations on one client device can interact with simulations on other devices.

15 Claims, 2 Drawing Sheets

(51) Int. Cl.
 *A63F 13/352* (2014.01)
 *A63F 13/355* (2014.01)
 *A63F 13/57* (2014.01)

(56) References Cited

U.S. PATENT DOCUMENTS

| | | | | |
|---|---|---|---|---|
| 8,860,717 B1 * | 10/2014 | Zeiger | ................. | G06F 3/04847 345/419 |
| 2008/0247636 A1 * | 10/2008 | Davis | ...................... | G09G 5/00 382/152 |

OTHER PUBLICATIONS

International Search Report and Written Opinion issued in related Application Serial No. PCT/EP2021/075113 on Jan. 21, 2022.

\* cited by examiner

IN-BROWSER, MULTI-PLAYER 3D ROBOTIC SIMULATOR

CROSS-REFERENCE TO RELATED APPLICATIONS

This application is a U.S. National Stage of International Patent Application No. PCT/EP2021/075113, filed on 13 Sep. 2021, which claims the benefit of GB Patent Application No. 2014332.7, filed on 11 Sep. 2020. Each of the disclosures of which are incorporated herein by reference in their entirety.

TECHNICAL FIELD

This invention relates to a computer implemented method of simulating a three-dimensional (3D) object for display in a browser on a client's device. More specifically, the invention relates to a computer implemented method of simulating a three-dimensional object for simultaneous display in a plurality of browsers on a plurality of clients' devices. In addition, this invention further relates to a computer program product, and an in-browser robotics 3D object simulator.

BACKGROUND ART

Simulation of three-dimensional objects, and in particular simulation of robotics, is a multi-billion-dollar business with substantial potential. It is highly advantageous to provide customers with the ability to render their robotics in a web browser where they can create, view and share their simulations. In this way, the simulations can be used for a wide array of different purposes, from training to testing, evaluation to education.

There are however a number of problems with the existing offerings. Heretofore, the existing offerings have been quite limited. Generally speaking, due to the computational burden placed on the processor, the simulations for all but the most basic robots and three-dimensional objects are necessarily at a low frame rate when being executed on a customer's machine. This low frame rate tends to lead to a jittery, stop-start simulation that is difficult to properly evaluate and appreciate.

Secondly, heretofore, the simulations for delivery though a browser have been limited by the use of relatively old physics engines, such as, but not limited to, Bullet v.2.82 (released 2013). Although useful for many projects, Bullet 2.82 is quite limited in its application compared with newer physics engines and does not support functionality typically supported by more modern non-web-based physics engines. Furthermore, it is generally accepted that development with in-browser physics engines was a difficult task that required large amounts of complex code. This further slowed down the processing of the simulations.

The applicant has developed a computer implemented method, computer program product and an in-browser robotics simulator, as described in detail in the applicant's own co-pending PCT Patent application no. PCT/EP2020/061530, that overcomes the problems outlined above and that allows users to create 3D simulations and share those simulations with third parties. The entire contents of PCT Patent application no. PCT/EP2020/061530 filed on 24 Apr. 2020, are incorporated herein by way of reference.

However, there is a further desire to enhance the offering. More specifically, there is a desire to provide a multiplayer offering. The multiplayer offering would allow multiple users to independently manipulate their 3D object and share the results of those manipulations with other users in a group. In this way, the 3D object of one user could interact with the 3D object(s) of one or more other users. In addition, multiple users could simultaneously view a first user manipulate their 3D object. Preferably, the service could be delivered without recourse to an external library or service.

It is an object of the present invention to provide a computer implemented method, a computer program product, and an in-browser robotics simulator that overcome at least one of the above-identified problems. It is a further object of the present invention to provide a useful alternative choice for the consumer.

SUMMARY OF INVENTION

According to the invention there is provided a computer implemented method of simulating a three-dimensional (3D) object for simultaneous display in a browser on each of a plurality of client devices, the method comprising the initial steps of:
generating a 3D object and storing the 3D object in memory;
storing a plurality of physics libraries in memory;
storing a simulation application programming interface (API) linking a physics engine and a rendering engine, and a simulation computer program code, in memory; and
on a web page load request issued through the browser on each of the client devices:
establishing a communication link between the client device and the other client devices;
loading the simulation application programming interface (API) and the simulation computer program code onto each of the client devices;
importing the 3D object and at least one of the physics libraries to each of the client devices;
simulating the 3D object using the simulation API, the rendering engine, and the physics engine having access to the imported physics library;
rendering the 3D object in each of the client device browsers, and, for each subsequent frame:
receiving 3D object manipulation instructions from one client device;
updating the rendered 3D object by using the physics engine to generate position and rotation data for the 3D object and sending that position and rotation data to the rendering engine on each of the client devices;
the rendering engine updating the rendered 3D object based on the position and rotation data received from the physics engine and displaying the updated rendered 3D object on each of the client devices.

In one embodiment of the invention there is provided a computer implemented method in which the method comprises the step of receiving 3D object manipulation instructions from one or more of the other client device and updating the rendered 3D object using those object manipulation instructions.

In one embodiment of the invention there is provided a computer implemented method in which the step of establishing a communication link between a pair of client devices comprises the initial step of establishing a client-server network in-browser on one client device to enable sharing from one client device to one or more other client devices.

In one embodiment of the invention there is provided a computer implemented method in which the method comprises the step of using an intermediary signalling server to establish the communication link between a pair of client devices.

In one embodiment of the invention there is provided a computer implemented method in which once the communication link between the pair of client devices is established, the method comprises bypassing the intermediary connection server and routing communications directly between those client devices.

In one embodiment of the invention there is provided a computer implemented method in which the method comprises the rendering engine using client-side prediction on each of the client devices.

In one embodiment of the invention there is provided a computer implemented method in which the method comprises the step of receiving 3D object manipulation instructions from one or more of the other client device's and updating the rendered 3D object using those object manipulation instructions.

In one embodiment of the invention there is provided a in-browser robotics 3D object simulator comprising:
  a rendering engine configured for operation in-browser;
  a physics engine configured for operation in-browser;
  an application programming interface (API) mapping the functions of the physics engine to the rendering engine; and
  the API configured to share a rendered 3D object with at least one remote client device.

In one embodiment of the invention there is provided an in-browser robotics 3D object simulator in which the API shares the 3D object rendering data with at least one remote client device using a net.add command.

In one embodiment of the invention there is provided an in-browser robotics 3D object simulator in which the API is configured to communicate with a signaling server to establish a communication link with the other remote client device.

In one embodiment of the invention there is provided a in-browser robotics 3D object simulator in which the API is configured to establish a client-server network in-browser.

In one embodiment of the invention there is provided a in-browser robotics 3D object simulator in which the API incorporates client-side prediction.

In one embodiment of the invention there is provided a computer program product having program instructions loaded thereon that when executed on a computer, cause the computer to carry out one or more of the method steps of:
  on a web page load request issued through a browser on a client device:
  loading a simulation application programming interface (API) and a simulation computer program code onto the client device;
  importing a 3D object and at least one of a plurality of physics libraries to the client device;
  establishing a communication link between the client device and at least one remote client device;
  simulating the 3D object using the simulation API, a rendering engine, and a physics engine having access to the imported physics library;
  rendering the 3D object in the client browser, and, for each subsequent frame:
  receiving 3D object manipulation instructions;
  updating the rendered 3D object by using the physics engine to generate position and rotation data for the 3D object and sending that position and rotation data to a rendering engine on each of the remote client devices;
  the rendering engines on the client device and the remote client devices updating the rendered 3D object based on the position and rotation data received from the physics engine and displaying the updated rendered 3D object.

In one embodiment of the invention there is provided a computer program product comprising the step of receiving 3D object manipulation instructions from a remote client device.

BRIEF DESCRIPTION OF THE DRAWINGS

The invention will now be more clearly understood from the following description of some embodiments thereof given by way of example only with reference to the accompanying drawings, in which:—

DETAILED DESCRIPTION OF THE DRAWINGS

Figure 1:
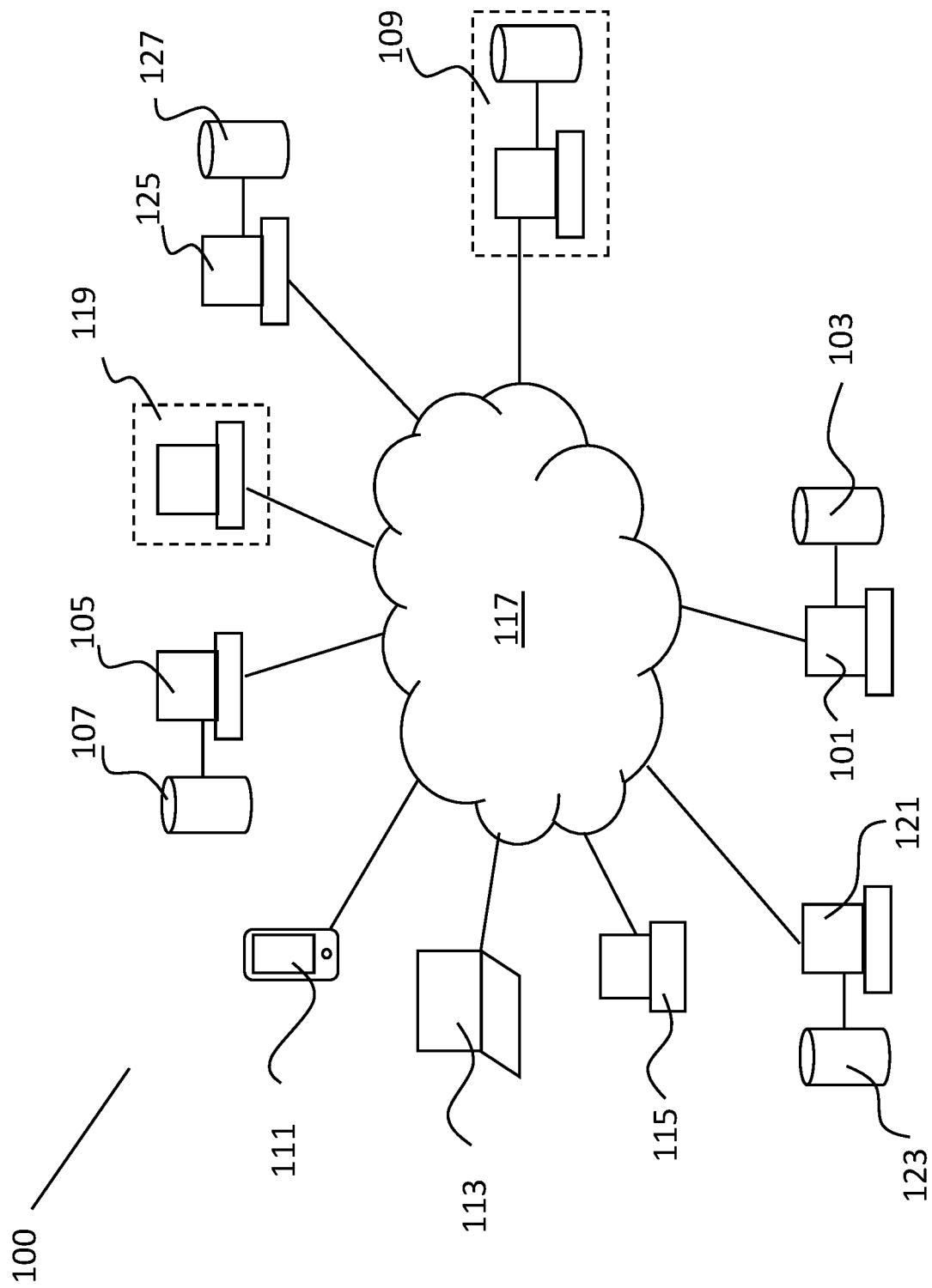
FIG. 1 is a diagrammatic representation of a system in which the method according to the invention may be performed.

Referring to FIG. 1, there is shown a system in which the method according to the invention may be implemented, indicated generally by the reference numeral 100. The system comprises an operator computing device 101 with associated memory 103, and a client device 105 with associated memory 107. There is further shown a remote computing device 109, forming part of a content distribution network (CDN) of the operator, a plurality of third-party computing devices including a smart phone 111, a laptop computer 113 and a PC 115, all of which can communicate with each other through communications network 117. There is provided a web server 119 for hosting content for a content provider, the content being accessible to the client device 105. In addition, there are provided a further pair of client devices 121, 125, each of which has associated memory 123, 127 respectively. The content is also accessible by the client devices 121, 125, as will be described in more detail below.

In use, the method comprises the initial steps of the operator generating a 3D object and storing the 3D object in memory 103. Furthermore, the operator stores a plurality of physics libraries in memory 103 along with a simulation application programming interface (API) linking a physics engine and a rendering engine, and a simulation computer program code. The simulation API and simulation computer program code may be stored in the CDN 109, whereas the 3D object and physics libraries may be stored on web server 119.

The simulation API references a library of reusable code that can be invoked in the simulation computer program code. The simulation computer program code is the code that is written to create a particular simulation of a 3D object. The simulation computer program code makes use of the simulation API library and will contain functions that can be found in the API library. Therefore, it will be necessary to load the API in order to run the simulation code. The API reduces the amount of code required. By this, what is meant is that the amount of code that is required to be written by the developer, i.e. the simulation computer program code. Strictly speaking, it is the features of the code library that allow for the code reduction as the API is the point of contact used for interaction between two running codes. The code library is written using best practices in that it is as efficient as possible.

The client device issues a web page load request using a browser (not shown) on the client's device 105. The method then comprises the steps of loading the simulation application programming interface (API) and the simulation computer program code onto the client's device 105 from the memory 103, (or from the CDN 109), importing the 3D object and at least one of the physics libraries to the client's device 105 from the web server 119, and simulating the 3D object using the simulation API, the rendering engine and the physics engine having access to the imported physics library. The 3D object is rendered in the client's browser, and, for each subsequent frame, the rendered 3D object is updated by using the physics engine to generate position and rotation data for the 3D object, that position and rotation data is sent to the rendering engine, and the rendering engine updates the rendered 3D object based on the position and rotation data received from the physics engine before displaying the updated rendered 3D object.

Instead of client device 105, the client may use any of the client devices 111, 113, 115 shown, or indeed another client device 121, 125 capable of accessing the web server and displaying a web page. For example, a smartphone, an internet enabled television, a tablet, a phablet, a smart watch or the like could also be used to view the simulation.

Once the operator has completed the simulation of the content provider's robot, the operator provides the content provider with API documentation that will allow the content provider to easily control their simulation with Javascript (Registered Trade Mark®) commands. If desired, the following steps are then taken in order to integrate the simulation into the content provider's web page.

In step 1, the operator provides the content provider with a folder of files containing any 3D assets and the physics library files. (Note: Any files that contain operator source code may be obfuscated using the tool https://obfuscator.io/.) In step 2, the content provider places these files in a folder on their web server 119. In step 3, the operator will host a CDN (only part of which, computing device 109, is shown, that contains the simulation API as well as the simulation code. This must be loaded onto the client device in order for the client device to run the simulation. This allows the operator to easily make updates to the code. In step 4, the content provider will integrate the simulation into their web page with code similar to the following code segment 1, shown below:

```
//Load the CDN
<script src="https://cdn.com/simbot.js"></script>
<script>
var view=null, math=null;
//Fetch the HTML container where the simulator will be
    injected
var robotDiv=document.getElementById('robotDiv');
var math=VIEW.math;
var view=VIEW.engine;
//Initialise the simulator into 'robotDiv'
view.init({worker:true, export:true, ground:true, div:robotDiv, callback:demo});
</script>
```

Code Segment 1

The content provider is thereafter ready to begin simulations through their web server to third parties (operating a client device).

From a technical perspective, the method according to the present invention enables robotics simulations that were not previously possible to run in a native web browser. This is due in part to the port into Javascript® of Nvidia's @ PhysX® 4.1 physics library. Until now, the most powerful in-browser engine has been Ammo.js which, as of July 2020, is a Javascript port of a 2013 physics engine. The use of PhysX 4.1 allows for new simulation possibilities, such as tank physics, 4WD vehicle physics, joint articulation physics (for simulating robotics such as Robot Arms), wheel slip physics and more. The Javascript port of PhysX also offers significant improvements in friction and performance with high numbers of simulated objects. Previously, development with in-browser physics engines was a difficult task that required large amounts of complex code. For example, a simple demonstration simulation displaying a number of pyramids, each of which is constructed from a plurality of blocks, previously required 232 lines of code but using the API according to the present invention, now only requires 43 lines of code, a reduction of over 80%.

In order to port PhysX, in one embodiment Emscripten was used. Emscripten (www.emscripten.org) is a source-to-source compiler used to compile C and C++ code into JavaScript.

The method and in particular the API component of the present invention makes it possible to add simulated bodies to a 3D scene with minimal amounts of code required. In order to add a simulated entity, whether that is a simple cube or a 4WD vehicle, it often only requires a single line of code which contains the configuration options for the simulated entity. For example, to add a cube to the simulation using the API according to the present invention, the following code segment 2 would be required:

```
view.add ({pos: [-10, 2.5, 0], size: [1,5,1], rot: [0,35,0]})
```

Code Segment 2

In order to add a cube without the API according to the present invention, the code would look something like code segment 3 below:

```
const tmpMat=new THREE.Matrix4( )
const tmpVec2=new THREE.Vector3( )
var stackGL, stackPX;
//create material and a box in physx
var matPX=physics.createMaterial(0.5, 0.5, 0.5);
var box=new Px.BoxGeometry(0.5, 0.5, 0.5);
var shape=createShape(box, matPX);
//set position for cube
tmpVec2.set(pos.x, pos.y, pos.z);
tmpMat.make    Translation(tmpVec2.x,    tmpVec2.y,
    tmpVec2.z);
stackGL.push(new THREE.Mesh(mesh, matGL));
stackPX.push(createDynamic(tmpMat, shape, 1));
glscene.add(stackGL[stackGL.length—1]);
//create the box shape
function createShape(geometry, matPX)
{
var flags=new Px.ShapeFlags(Px.ShapeFlag.eVISUALIZATION.value|
Px.ShapeFlag.eSCENE_QUERY_SHAPE.value
Px.ShapeFlag.eSIMULATION_SHAPE.value);
var shape=physics.createShape(geometry, matPX, false,
    flags);
flags.delete( )
return shape;
}
```

```
//add a rigidbody to the shape for collisions
function createDynamic (transform, shape, density)
{
    var localTm=new Px. Transform (new Float32Array
        (transform.elements));
    var dynamic=physics.createRigidDynamic (localTm);
    localTm.delete( )
    dynamic.attachShape(shape);
    Px.RigidBodyExt.updateMassAndInertia(dynamic, den-
        sity, null, false);
    pxscene.addActor(dynamic, null);
    return dynamic;
}
```

Code Segment 3

It can be seen therefore that the computation overhead and time to process the code will be significantly reduced. Another advantageous aspect of the API is that the API allows for automatic linking between the rendering and physics engine and provides simple API commands to do so. An example to add a 3D model with physics collisions using the API is illustrated in Code Segment 4 below:

```
//from the 'duck' 3D model, find the object called
    'LOD3spShape', scale it to 0.03,
    store in a variable called 'model'
var model=view.getMesh('duck', 'LOD3spShape', 0.03);
//Calculate an optimised collision shape for the model,
    store in a variable called
    'shape'
var shape=view.toConvex(model);
view.add({
type:'convex',//type 'convex' is for a loaded 3D model
Mass: 1,//Set mass of object
pos: [0,0,0],//Set position of object
Shape: shape,//The computed collision shape for the
    model
Mesh: model,//The 3D model itself
restitution: 0.4//Restitution value or 'bouncy' value})
```

Code Segment 4

In addition to the foregoing, the present invention also makes it possible to run multithreaded physics in a web browser which helps with performance when simulating a large number of objects at once. The simulator runs physics in a Javascript web worker by default, and there is no extra configuration required for convenience. In the present implementation of the invention, phy.js is being run in the web worker. Using the following code content from the code library:

```
worker=new Worker (isExport? './build/phy.min.js':'./
    build/phy.js');
``` a worker will be run using phy.min.js if the isExport Boolean is true, otherwise it will run phy.js in the Worker. It is possible to enable physics multithreading using the port of PhysX according to the invention. Multithreading is only supported on Google Chrome browser at the moment however it is envisaged that extension to other browsers will be readily understood to the skilled addressee. The only change required to allow for multi-threading is the following line of code, shown as code segment 5 below, illustrating the use of three threads, along with the alternative line of code for no multithreading:

```
//use 3 threads
    dispatcher=Px.MultithreadCpuDispatcherCreate(3);
Instead of
    //use main thread
    dispatcher=Px.MultithreadCpuDispatcherCreate( )
```

Code Segment 5

These are functions that are built into the PhysX library. While this can increase performance on certain devices, there are some limitations of multithreading using the port of PhysX developed according to the present invention. First of all, the program memory cannot dynamically "grow", so this means that the memory requirements are hardcoded at compilation time (For example: 128 MB). This is an Emscripten specific limitation. In order to circumvent the problem, it is possible to do a malloc/new (dynamic memory allocation), but it cannot exceed the hardcoded limit. This is troublesome because the operator must have a good understanding of the scene memory requirements, or allocate a high memory limit from the beginning (which can be a waste of resources). Secondly, the number of threads must also be hardcoded at compilation time (For example: 2 threads, etc.). This is because of PhysX itself and not Emscripten which is able to allocate threads dynamically. But this is problematic too, as the number of available threads depend on the user machine. For this problem, the following workaround may be used: as detecting the number of threads is possible from Javascript, if a version for each typical thread configuration (1,2,4,8) is compiled, there will be the opportunity to start the version that would best suit the host platform. In this way, the resources are used more effectively and the code will be processed more efficiently.

Figure 2:
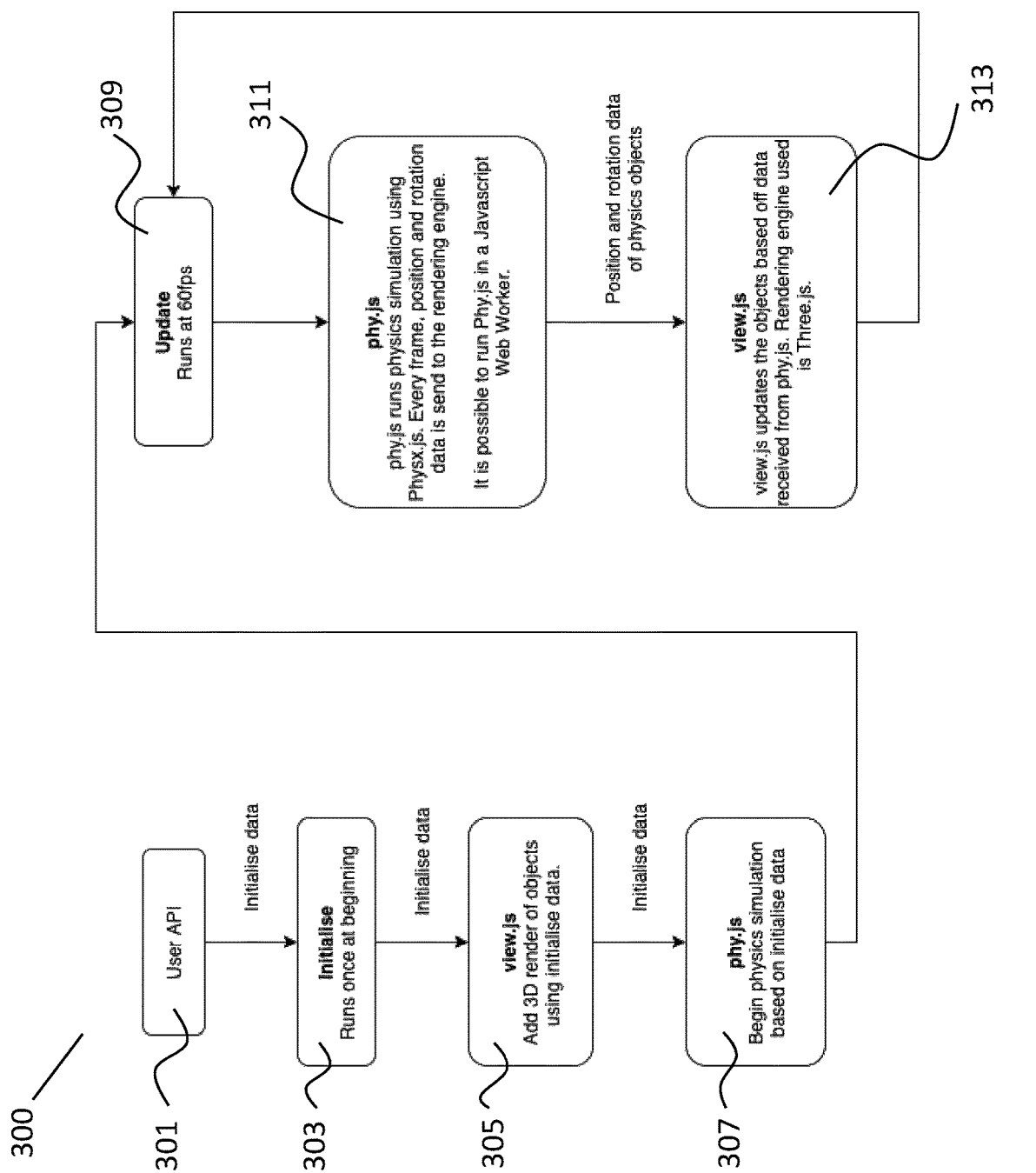
FIG. 2 is a schema of the simulator and its functional components.

Referring now to FIG. 2, there is shown a schema of the simulator and its functional components, indicated generally by the reference numeral 300. The client uses User API in step 301 to begin the process. This includes step 303, an initialisation step, which sets the parameters for the simulation and runs once at the beginning. Thereafter, in step 305, the component view.js adds the 3D render of objects using the initialisation data and in step 307, the phy.js component begins the physics simulation based on the initialisation data. The simulation is updated in step 309. The updates run at 60 frames per second which will be practically seamless to a viewer. Once updated, simulation proceeds to step 311 in which the phy.js component runs the physics simulation using Physx.js. For each frame, the position and rotation data is sent to the rendering engine. It is possible to run the Phy.js in a Javascript web worker if desired. In step 313, the view.js will update the objects based on the data received from phy.js in the previous step. The rendering engine used is Three.js. Three.js is a cross-browser JavaScript Library and API used to create and display 3D graphics in a web browser. After the frame is rendered, the method reverts back to step 309, the update and then cycles through steps 311 and 313 for the simulation. If desired, a break may be introduced into the method so that it will only cycle through the steps 309, 311, 313 a predetermined number of times before completing the simulation.

It will be understood from the foregoing that there are numerous uses and benefits for the present invention. For example, it is envisaged that the 3D object may be a piece of equipment, the web server may be operated by a manufacturer/supplier of assembly line equipment and the client device may be operated by a potential customer. The potential customer can simulate the operation of the equipment to determine whether or not it will function as required and what clearances etc are required. Alternatively, the content provider may be a provider of online games and the client device may be operated by a gamer, operating a robot or other device in a challenge against the clock or other users. This will be described in more detail below under the heading "Multi-player", which is a particular focus of the present application.

Alternatively still, the web server could be operated by a company or organisation for their design team (internal, external or both internal and external) and the design team may be able to access the simulation, evaluate the simulation and see if and how it could be improved prior to going into production. Similarly, the 3D object could be a vehicle such as an airplane, helicopter or spacecraft, or several vehicles simulated together such as cars, motorcycles, trucks, boats or combinations thereof. The simulation could be used by a group of users, including, but not limited to, a crash investigation team determining likely cause of failure and/or likely sequence of events in a crash or the like.

Multi-Player:

One particularly advantageous aspect of the present invention is the possibility to implement a multi-player environment. The multiplayer API plugin, based on WebRTC, for the JS engine makes it simple to create multiplayer applications without the use of an external library or service.

The multiplayer plugin allows for (i) automatic matchmaking with other online users; (ii) a user to create a multiplayer server which other users can join; (iii) teams of users to play against/with each other; and (iv) an observer to be able to watch another user move an object in real time.

The multi-player API is built into the core engine and inherits the same code structure, for example, the "view.add" feature. However, in order to enable multi-player objects, the API command "net.add" is used instead of the command "view.add". In this way, it is simple to add multiplayer functionality to an existing piece of code. In this way, time consuming and non-reusable multiplayer integrations are avoided. In addition, there is also provided client-side prediction built into the multiplayer engine which means that when viewing the other player on the client device's screen, their movements will appear smooth even on slower internet speeds.

More specifically, net.add is intended to be a drop-in replacement for view.add, with a few optional multiplayer-related parameters. it works by sending a request to the server to add a new rigid body, vehicle, or articulation. The server will then echo the request to all connected clients. The end result is each player internally calls view.add so each player can see the added object. On every physics step, the "simulatee" will send the object's position and rotation to the server, which then echos it back to other players. Some physics steps may be skipped to avoid buffer overflows, resulting in movement that appears stuttery to other players. To fix this, client-side prediction is used. The object is kinematic to everyone except the "simulatee". This prevents other players from affecting this body in the physics simulation. Only the chosen "simulatee" can apply forces to the object.

As will be understood, client-side prediction is a method of 'smoothing' out player movements. If this were not present, the robot's movement could appear very choppy as the position would not update until the positional data is received from the server. Generally speaking, data from the server is not received fast enough to support a 60 fps simulation so client-side prediction is used to 'fill in the gaps'. It operates by predicting the position and rotation of a 3D object based on the last available position, rotation and velocity. For example, a velocity of 1 m/s forward is received from the server, the velocity received matches the last received velocity. It is safe to assume that the object is moving forward at a constant speed of 1 m/s so the object will continue to move forwards until a different velocity is received from the server. There are also lerp and slerp functions applied for further smoothing. E.g if a position of 0,0 followed by 0,10 is received, a lerp/slerp function will be used to interpolate between the two values resulting in a smooth animation to the target position. Without lerp or slerp, it would be instantaneous and appear 'choppy'.

The multi-player API is able to create an entire client-server network in-browser. This is achieved using an intermediary signaling server to establish the connection. Thereafter, connections between users are direct and once established, don't require a middleman (i.e. the signaling server is no longer required), meaning lower latency and extremely low cost. A master server, more commonly referred to as a signalling server, which may be provided by the operator computing device 101 or other device, is provided. The server helps with the initial connection establishment between users (players). The master server is designed to be as lightweight as possible and exchange minimal amounts of information. Once the connection is established, the master server is no longer needed until another client wishes to join the server.

The client-server network in browser is achieved using webrtc to create direct connections between players and a signalling server (also referred to it as the master server) to help establish these connections. The server holds a list of rtcpeerconnections, one for each connected client. Each client only has one rtcpeerconnection, to the server. In order for a client to communicate to other clients, it must relay information through the server.

More specifically, when a new client wants to join, the following steps may be followed (note steps 5 to 9 inclusive are understood to be standard procedure for using webrtc). First of all, a client will connect to the master server. Secondly, the client sends a "login" command to the master server containing username and name of the app they are wanting to play. Thirdly, the master server responds with a list of servers that are available to join. Thereafter, in step four, the user selects a server and in step five, a new RTCPeerConnection is then created. In step six, the connection creates an "offer" that is sent to the server it wants to join, using the master server as a relay between them and in step seven, the server responds to the offer with an "answer", again using the master server as a relay. In step eight, both client and server send each other "ICE candidates" using the master server as a relay. ICE candidates are a set of potential ip addresses, ports, etc. that the server and client can connect to in order to establish a direct connection between them. In step nine, using the provided offer/answer/ICE candidates, the client and server connect to each other and thereafter in step ten, the client closes its connection to the master server. Creating a server is as simple as clicking the host button. The newly created server and master server will maintain a connection for as long as the newly created server is open. This allows the master server to notify the newly created server when a client is attempting to join, beginning the webrtc signalling process.

Observers/spectators are the result of a player not creating an object (using net.add and view.follow) that they control. They are still able to watch the physics simulation but are unable to participate due to not adding their own body.

One alternative way in which the present invention could be implemented would be the use of websockets however these are not deemed entirely suitable. Websockets are slower (due to indirect connection between players) and more expensive (due to the need to host potentially hundreds of servers). It is understood that it is possible to integrate a multiplayer experience into Playcanvas (Registered Trade Mark) but the developer must use an external service and API in order to do so. It is not immediately apparent how a multiplayer game could be built using Playcanvas, however the API according to the invention makes it very easy to do, which enables multiplayer functionality to be rapidly deployed using the API according to the present invention.

In many ways, the simple shorthand API for creating a networked physics simulation is what sets the present invention apart from the existing offerings. There are a series of multiplayer "extensions" that make multiplayer integration fast and easy: core.js, to manage connections automatically with a single line of code; body.js, to manage creation, deletion, and updating of physics objects in the simulation; sound.js, to play 3d positional sound effects across all users' devices; chat.js, to provide communication functionality between user devices; and team.js, for organizing players into teams.

Referring once more to FIG. 1, it will be appreciated that the operator computing device 101 may provide a "game" environment in which multiple 3D devices can populate and operate. This game environment may be distributed via the CDN 109. Once each of the client devices 105, 121, 125 has the game environment loaded thereon, one or more of the client devices may populate the game environment with their 3D object. The 3D object may be, for example, a vehicle such as a car, a spacecraft, a boat or other craft, an avatar such as a fighter, a soldier, an athlete, a fictional character such as a cartoon character from the Marvel (Registered Trade Mark,®) franchise or the like.

One of the client devices may populate the environment with their 3D object and manipulate their 3D object in the environment while the other client devices are able to view the 3D object of the first client device progress through the environment. The environment could be, but is not limited to, a room, a ring such as a boxing ring or a cage, an ocean, a racetrack, a football field, a baseball arena, a landscape, a city, an island, a planet, outer space or another simulated environment. Alternatively, two or more of the client devices are able to populate the environment with their own 3D objects simultaneously. Rendering information about the 3D object(s) is transmitted to the other client device(s) so that it may be rendered on the other client device(s). In this way, the 3D objects are also configured so that they are able to interact with each other.

For example, the simulation may comprise a competition to develop a robot using certain limited components, e.g. a given number of wheels, motors, saws, clamps, hammer arms, bodywork etc. Each client device user can then construct their robot using the limited components and thereafter simulate their robot in the environment. The robot of one client device can then compete with the robot of the other client device(s) in time trial challenges, maneuverability challenges, or in "battles" to defeat the other robot of the other client device(s). In other words, it is possible to implement a "Robot Wars"® style competition in which robots developed by different users are used to compete against other robots and either break the other robots or push those robots into certain areas, using the method according to the invention.

It is envisaged how the environment could be a landscape of the planet Mars and the robots each have to navigate around the planet's surface, performing tasks, navigating difficult terrain and traversing canyons or other obstacles. The precise nature of the task or the environment is not important, what is important is that the different clients are able to view 3D objects on other client devices, and preferably interact with those other client devices 3D objects.

In the embodiments described, it is mentioned that simulation code and API may be stored on a different CDN to the 3D objects and physics libraries (operator provides content provider with folder of files). In addition, it is conceived that in another embodiment, the system, method and computer program product according to the present invention will host all assets on the same CDN. For the operation of the invention, it is not limited to where the files are stored remotely provided they are loaded on the webpage when required. For example, all the files can be stored by the content provider or they can all be stored by the operator.

It will be further understood that various parts of the present invention are performed in hardware and other parts of the invention may be performed either in hardware and/or software. It will be understood that the method steps and various components of the present invention will be performed largely in software and therefore the present invention extends also to computer programs, on or in a carrier, comprising program instructions for causing a computer or a processor to carry out steps of the method or provide functional components for carrying out those steps. The computer program may be in source code format, object code format or a format intermediate source code and object code. The computer program may be stored on or in a carrier, in other words a computer program product, including any computer readable medium, including but not limited to a floppy disc, a CD, a DVD, a memory stick, a tape, a RAM, a ROM, a PROM, an EPROM or a hardware circuit. In certain circumstances, a transmissible carrier such as a carrier signal when transmitted either wirelessly and/or through wire and/or cable could carry the computer program in which cases the wire and/or cable constitute the carrier.

It will be further understood that the present invention may be performed on two, three or more devices with certain parts of the invention being performed by one device and other parts of the invention being performed by another device. The devices may be connected together over a communications network. The present invention and claims are intended to also cover those instances where the system and/or method is operated across two or more devices or pieces of apparatus located in one or more locations in one or more jurisdictions.

In this specification the terms "comprise, comprises, comprised and comprising" and the terms "include, included, includes and including" are all deemed interchangeable and should be afforded the widest possible interpretation.

The invention is not limited to the embodiments hereinbefore described but may be varied in both construction and detail within the scope of the appended claims.

The invention claimed is:

1. A computer implemented method of simulating a three-dimensional (3D) object for simultaneous display in a browser on each of a plurality of client devices, the method comprising the initial steps of:

generating a 3D object and storing the 3D object in memory;

storing a plurality of physics libraries in memory;

storing a simulation application programming interface (API) linking a physics engine and a rendering engine, and a simulation computer program code, in memory; and on a web page load request issued through the browser on each of the client devices:
  establishing a communication link between the client device and the other client devices;
  loading the simulation application programming interface (API) and the simulation computer program code onto each of the client devices;
  importing the 3D object and at least one of the physics libraries to each of the client devices;
  simulating the 3D object using the simulation API, the rendering engine, and the physics engine having access to the imported physics library;
  rendering the 3D object in each of the client device browsers, and, for each subsequent frame:
    receiving 3D object manipulation instructions from one client device;
    updating the rendered 3D object by using the physics engine to generate position and rotation data for the 3D object and sending that position and rotation data to the rendering engine on each of the client devices;
    the rendering engine updating the rendered 3D object based on the position and rotation data received from the physics engine and displaying the updated rendered 3D object on each of the client devices.

2. The computer implemented method as claimed in claim 1 in which the step of establishing a communication link between a pair of client devices comprises the initial step of establishing a client-server network in-browser on one client device to enable sharing from that client device to one or more other client devices.

3. The computer implemented method as claimed in claim 1 in which the method comprises the step of using an intermediary signalling server to establish the communication link between a pair of client devices.

4. The computer implemented method as claimed in claim 3 in which once the communication link between the pair of client devices is established, the method comprises bypassing the intermediary connection server and routing communications directly between those client devices.

5. The computer implemented method as claimed in claim 1 in which the method comprises the rendering engine using client-side prediction on each of the client devices.

6. The computer implemented method as claimed in claim 1 in which the method comprises the step of receiving 3D object manipulation instructions from one or more of the other client devices and updating the rendered 3D object using those object manipulation instructions.

7. An in-browser robotics 3D object simulator comprising:
  a rendering engine configured for operation in-browser;
  a physics engine configured for operation in-browser;
  an application programming interface mapping the functions of the physics engine to the rendering engine; and
  the API configured to share a rendered 3D object with at least one remote client device.

8. The in-browser robotics 3D object simulator as claimed in claim 7 in which the API shares the 3D object rendering data with the at least one remote client device using a net.add command.

9. The in-browser robotics 3D object simulator as claimed in claim 7 in which the API is configured to communicate with a remote signaling server to establish a communication link with the other remote client device.

10. The in-browser robotics 3D object simulator as claimed in claim 7 in which the API is configured to establish a client-server network in-browser.

11. The in-browser robotics 3D object simulator as claimed in claim 7 in which the API incorporates client-side prediction.

12. A computer program product having program instructions loaded thereon that when executed on a computer, cause the computer to carry out one or more of the method steps of:
  on a web page load request issued through a browser on a client device:
    loading a simulation application programming interface (API) and a simulation computer program code onto the client device;
    importing a 3D object and at least one of a plurality of physics libraries to the client device;
    establishing a communication link between the client device and at least one remote client device;
    simulating the 3D object using the simulation API, a rendering engine, and a physics engine having access to the imported physics library;
    rendering the 3D object in the client device browser, and, for each subsequent frame:
      receiving 3D object manipulation instructions;
      updating the rendered 3D object by using the physics engine to generate position and rotation data for the 3D object and sending that position and rotation data to a rendering engine on each of the remote client devices;
      the rendering engines on the client device and the remote client devices updating the rendered 3D object based on the position and rotation data received from the physics engine and displaying the updated rendered 3D object.

13. The computer program product as claimed in claim 12 comprising the step of receiving 3D object manipulation instructions from a remote client device.

14. The computer implemented method as claimed in claim 2 in which the method comprises the step of using an intermediary signalling server to establish the communication link between a pair of client devices.

15. The computer implemented method as claimed in claim 12 in which once the communication link between the pair of client devices is established, the method comprises bypassing the intermediary connection server and routing communications directly between those client devices.

* * * * *